July 28, 1936.   E. D. TEMPERLI   2,049,386
SERVING TRAY
Original Filed May 7, 1934
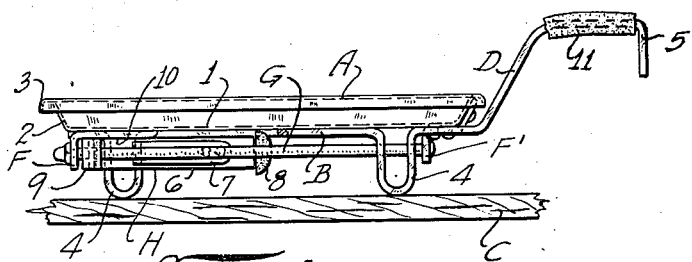
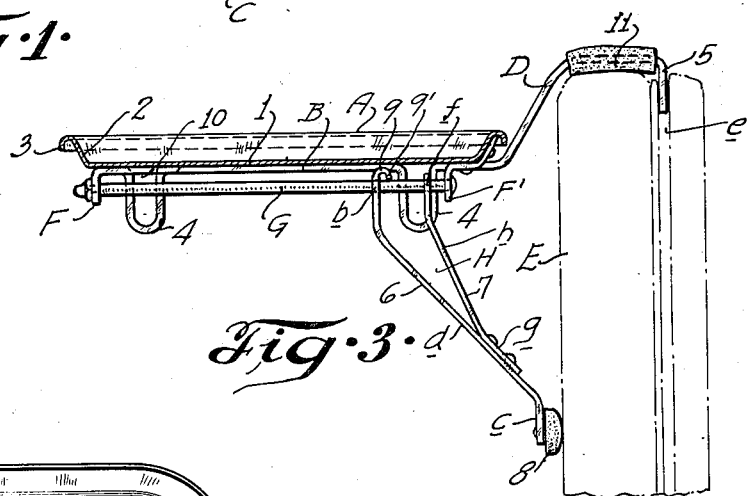
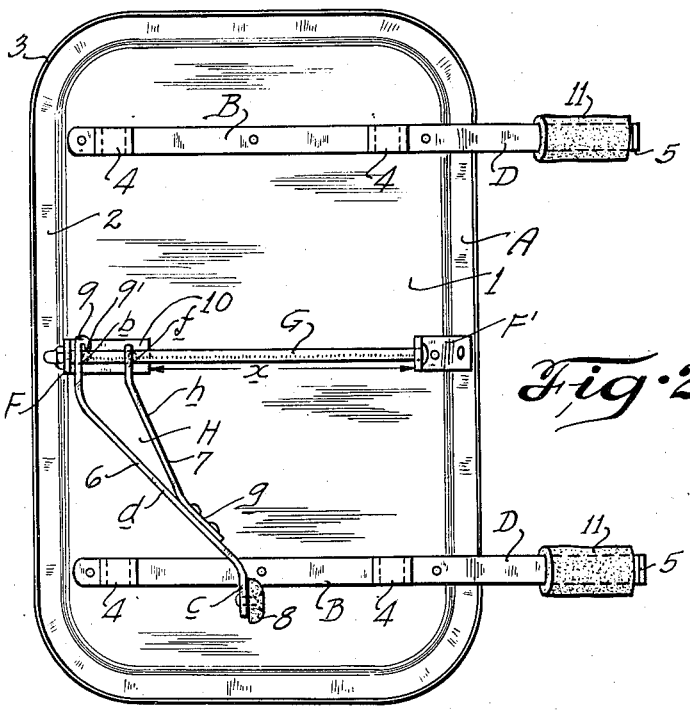
INVENTOR
Edward D. Temperli.
BY
ATTORNEY Patented July 28, 1936

2,049,386

UNITED STATES PATENT OFFICE 2,049,386

SERVING TRAY

Edward David Temperli, St. Louis, Mo., assignor, by mesne assignments, to Tray Service Company, Dallas, Tex., a corporation of Texas Application May 7, 1934, Serial No. 724,311
Renewed December 24, 1935

4 Claims. (Cl. 311—22)

This invention relates generally to serving-trays. Most particularly, my invention relates to a certain new and useful improvement in trays of the type especially adapted for detachable mounting on an automobile for the serving of refreshments to the occupants thereof and has for its chief object the provision of a tray of the type stated which may be readily and economically manufactured, which is durable, which may with facility be firmly detachably mounted upon, and for disposition selectively either upon the inside or outside of, the automobile for the convenience of its occupants, which may be compactly stacked or nested with like trays when not in service, and which is efficient in the performance of its intended functions.

And with the above and other objects in view, my invention resides in the novel features of form, construction, arrangement, and combination of parts presently described and pointed out in the claims.

In the accompanying drawing,—

Figure 1 is a side elevational view of a serving-tray of my invention, shown with its supporting-brace in folded or collapsed condition for convenient resting of the tray on a table, counter, or the like;

Figure 2 is an enlarged inverted plan view of the tray, shown as in Figure 1; and Figure 3 is a transverse sectional view of the tray, shown with its supporting brace in unfolded or extended condition and the tray in attached serving position upon an automobile.

Referring now more in detail and by reference characters to the drawing, which illustrates a preferred embodiment of my invention, A designates the tray proper, which is constructed preferably of any suitable sheet metal, and which preferably is of oblong-rectangular contour and of relatively shallow dish formation, the tray A comprising a base-plate 1 marginally finished with an obliquely upwardly and outwardly disposed wall 2 having, in turn, a rounded marginal lip, as at 3.

Extending transversely, and riveted or otherwise rigidly fixed to and upon the under face, of the tray-base 1, and disposed in suitably spaced relation longitudinally of the tray A, are flat preferably metal strips B, B, which are integrally formed, at suitably spaced points within their length under the tray-base 1, with registering U-bends, as they may be called, whereby the tray A is provided with relatively short legs 4 for conveniently resting the tray A upon a table, counter, or the like C.

At one, or the so-called rear, side of tray A, the strips B are integrally extended rearwardly and then obliquely upwardly and outwardly and then again rearwardly in the provision of arms D disposed above the plane of the tray A and each provided with a down-turned or hook-end portion 5 for engagement over the sill of a window-opening of an automobile door or the like E or within the window slot or groove e thereof, as illustrated in Figure 3.

Also fixed on the under face of the tray-base 1 and disposed intermediate the strips B adjacent the front and rear margins of the tray A, are angle-brackets F, F', engaged with, and supported by, the downwardly presented or depending portions or legs of which, is a transverse rod G.

H designates a brace, which includes a main strip 6 and a re-enforcing strip 7, which in side elevation have the shape or configuration best seen in Figures 2 and 3. As shown, the main strip 6 comprises approximately parallel end-portions b and c integrally joined by an obliquely disposed intermediate portion or shank d, and the strip 7 comprises angularly disposed end-portions f and g integrally joined by an intermediate also obliquely disposed portion or shank h, the strip 7 being disposed flatwise at its lower end-portion g on, and there riveted or otherwise permanently fixed to, the shank d of main strip 6, and the main strip 6 being provided upon the rearwardly presented face of its lower end-portion c, for purposes presently appearing, with a cushion 8.

At their respective upper ends, the strips 6 and 7 are suitably spaced the one from the other and provided with registering apertures or openings for fitting upon and accommodating the rod G for supporting the brace H for both swingable and adjustable shiftable movement on the rod G, for purposes also presently appearing.

At its upper end, the strip 6 is bent upon itself in the provision of a so-called hook, as at 9, whose bill 9' is at its end in close adjacence to the rod G, and it is to be noted that the normal space or distance between the under face of tray-base 1 and the rod G is merely or just about sufficient to freely accommodate the hook 9 when the brace H is in extended or depending position relatively to the tray A.

However, it will be observed that the flat horizontal portion 10 of bracket F, through or by reason of the thickness thereof, reduces such normal distance or space between the under face of the tray-base 1 and the rod G to such extent as to only accommodate the hook 9 when sidewise presented, as it may be said, to the under face of the tray-base 1. It follows that the shiftable adjustable movement along the rod G of brace H, when in extended or depending position, that is to say, when disposed at approximately right angles to the tray A, is limited to the space, as at x, as indicated in Figure 2. Yet the brace H is normally freely swingable on the rod G at any point within the space x, and when in collapsed condition, that is to say, when swingably disposed in substantially parallel relation with the under face of the tray-base 1, the brace H may be shifted along the rod G and under the bracket-leg 10, and when in such position and so shifted, the hook 9 functions in its engagement with the under face of the tray-base 1 in releasably retaining the brace H in its described collapsed condition.

Accordingly, in use and operation, by means of the hook-arms D, the tray A may be readily hookwise engaged with the automobile and selectively disposed for service either upon the outer or inner face of the door E, as may be desired to meet the convenience of the occupants, and to prevent marring or scratching of the automobile, each arm D is preferably, as shown, equipped with a protective cushion-sleeve or the like 11.

The arms D being so disposed, the brace H, in extended position, is shifted rearwardly along the rod G and pressed in engagement at its cushion 8 with the presented face of the door E. Under such engagement, the brace H is yieldingly tilted outwardly and thereby frictionally engaged at the bill 9' of its hook 9 with the rod G, and the brace H thereby firmly retained in door-engagement, and the tray A efficiently supported in serving position, the strip 7 reenforcing the strip 6 in and during such door-engagement of the brace H and also to a certain extent augmenting the frictional tray-retaining engagement of the brace H with the rod G.

The service being completed, the brace H may be readily disengaged from the door E, swung to collapsed position, and shifted along the rod G to dispose the hook 9 sidewise intermediate the rod G and the under face of bracket-leg 10. The brace H is thereby retained, as described, in collapsed position flatwise under the tray-base 1, when the tray A may be conveniently rested at its legs 4 on a counter or the like C and when also compact nesting or stacking of the trays to occupy reduced space is more or less easy and convenient.

By means of the co-operation between the arms D and brace H and the adjustable disposition of the brace H, the tray may also be readily mounted on doors or other supports E of different thicknesses, and it is to be understood that changes in the form, construction, arrangement, and combination of the several parts of the tray may be made and substituted for those herein shown and described without departing from the nature and principle of my invention.

Having thus described my invention, what I claim and desire to secure by Letters Patent is,—

1. In combination, a tray, a rod fixed to and disposed lengthwise in spaced relation under the tray, means including a brace for securing the tray in operative serving position on a support, said brace comprising a main strip having an apertured upper end-portion receiving the rod, and a plate fixed to and upon the under face of the tray for reducing for a first portion of the length of the rod the space therebetween and the tray, the space between the rod and the tray being such that for a second portion of the length of the rod the brace end-portion clears the under face of the tray for permitting shiftable and swingable movement of the brace relatively to the tray and for the first portion of the length of the rod the brace end-portion is engageable with the under face of said plate for retaining the brace in swung collapsed condition under and in approximate parallel relation to the tray.

2. In combination, a tray, brackets fixed to and upon the under face of the tray, a rod lengthwise supported by the brackets in spaced relation under the tray, means including a brace for securing the tray in operative serving position on a support, said brace comprising a main strip having an apertured hook end-portion receiving the rod, and a plate-extension on one of the brackets for reducing for a portion of the length of the rod the space therebetween and the tray, the space between the rod and the tray being such that for a second portion of the length of the rod the hook end-portion of the brace clears the under face of the tray for permitting shiftable and swingable movement of the brace relatively to the tray and for the first portion of the length of the rod the brace hook end-portion is engageable with the under face of said plate-extension for retaining the brace in swung collapsed condition under and in approximate parallel relation to the tray.

3. In combination, a tray, a cylindrical rod mounted on and transversely disposed in spaced relation under the tray, and means for securing the tray in operative serving position on a support, said means including a brace comprising a main strip having approximately parallel end-portions joined by an intermediate obliquely extending portion and a re-enforcing strip fixed at its lower end to the main strip, said strips at their respective upper end-portions being spaced one from the other and having registering apertures for directly receiving said rod whereby said brace is mounted for shiftable movement parallel with, and for swingable movement at right angles to, the transverse axis of the tray.

4. In combination, a tray, a cylindrical rod mounted on and transversely disposed in spaced relation under the tray, and means for securing the tray in operative serving position on a support, said means including a brace comprising a main strip having approximately parallel end-portions joined by an intermediate obliquely extending portion, said strip having an apertured upper end-portion for directly receiving said rod whereby said rod is mounted for tiltable movement, said main strip being also shiftable parallel with, and swingable at right angles to, the transverse axis of the tray, and said strip being engageable at its lower end-portion with a face of a support, a hook-extension on the upper end-portion of the strip engageable at its bill with the rod when the brace is in tilted engagement with a support for frictionally retaining the brace against shiftable movement on the rod, and a second strip fixed at its lower end to the main strip and at its upper end being spaced from the main strip and apertured for also directly engaging the rod for re-enforcing the main trip and augmenting the frictional engagement of the brace with the rod when the brace is in support engagement, said strip being also shiftable and swingable with the main strip relatively to the tray and rod.

EDWARD DAVID TEMPERLI.